US012681129B2

(12) United States Patent
Faragher et al.

(10) Patent No.: US 12,681,129 B2
(45) **Date of Patent: *Jul. 14, 2026**

(54) METHOD AND APPARATUS THAT USES RADIO TRANSMISSIONS FOR SURFACE MAPPING

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 336 days.

This patent is subject to a terminal disclaimer.

(21) Appl. No.: 18/371,915

(22) Filed: Sep. 22, 2023

(65) Prior Publication Data

US 2024/0103118 A1     Mar. 28, 2024

Related U.S. Application Data

(60) Provisional application No. 63/409,105, filed on Sep. 22, 2022.

(51) Int. Cl.
*G01S 5/02* (2010.01)
(52) U.S. Cl.
CPC .................................. *G01S 5/0273* (2013.01)
(58) Field of Classification Search
None
See application file for complete search history.

(56) References Cited

U.S. PATENT DOCUMENTS

| | | | |
|---|---|---|---|
| 9,780,829 B1 | 10/2017 | Faragher et al. | |
| 10,321,430 B2 | 6/2019 | Faragher et al. | |
| 10,417,902 B2 | 9/2019 | Langhammer | |
| 10,816,672 B2 | 10/2020 | Faragher et al. | |

(Continued)

OTHER PUBLICATIONS

International Search Report and Written Opinion for PCT/GB2023/052406 dated Dec. 20, 2023.

(Continued)

*Primary Examiner* — Whitney Moore
(74) *Attorney, Agent, or Firm* — Moser Taboada

(57) ABSTRACT

A method for mapping a surface using signals transmitted from a single transmitter comprises: receiving signals transmitted from the single transmitter, where each signal has a different propagation path; determining a motion of an antenna of the receiver; generating phasor sequences, where each phasor sequence represents a hypothesis based on antenna motion and a direction of arrival estimate for each received signal; compensating the received signals, local signals, or correlation results from correlating the received signals with the local signals using the phasor sequences based on the hypotheses to generate compensated correlation results; determining a preferred hypothesis in the hypotheses for each received signal that optimizes each correlation result; identifying a direction of arrival for each received signal using the determined hypothesis; determining a point of reflection from the direction of arrival of each received signal; and combining the points of reflection into one or more reflective surfaces.

33 Claims, 6 Drawing Sheets

(56)                    References Cited

U.S. PATENT DOCUMENTS

| | | | |
|---|---|---|---|
| 2020/0264317 A1 | 8/2020 | Faragher et al. | |
| 2020/0319347 A1 | 10/2020 | Faragher et al. | |
| 2021/0055110 A1* | 2/2021 | Knutson | ................. G01S 19/40 |

OTHER PUBLICATIONS

Wenyu Guo et al., 2D Indoor Mapping and Location-sensing Using an Impulse Radio Network, Ultra-Wideband, 2005 IEEE International Conference on Zurich, Switzerland 05-08, Sep. 5, 2005, pp. 296-301, XP010872624, DOI: 10.1109/ICU.2005.1570002.
Guerra Anna et al., Crowd-based personal radars for indoor mapping using UWB measurements, 2016 IEEE International Conference on Ubiquitous Wireless Broadband (ICUWB), IEEE, Oct. 16, 2016, pp. 1-4, XP033027124, DOI: 10.1109/ICUWB.2016. 7790437.

* cited by examiner

METHOD AND APPARATUS THAT USES RADIO TRANSMISSIONS FOR SURFACE MAPPING

CROSS-REFERENCE TO RELATED APPLICATIONS

This application claims priority to U.S. Provisional Patent Application Ser. No. 63/409,105 filed on Sep. 22, 2022, which is hereby incorporated by reference in its entirety.

BACKGROUND

Field

Embodiments of the present disclosure generally relate to radio signal processing and, in particular, to a method and apparatus for processing radio signals to perform surface mapping.

Description of the Related Art

Radio transmissions are used in various communications and positioning systems. For example, WiFi, using the IEEE 802.11a, b, g, n, ac standards, has become ubiquitous for short range data communications. WiFi access points (also referred to as WiFi hotspots) comprise radio transceivers that broadcast 2.4 or 5 GHz signals using a narrowband signal (e.g., 22 MHz). These access points can be used for low accuracy position location. Typically, multiple such access point transmissions can be used to multilaterate signals at a receiver of a WiFi enabled device and allow the receiver to determine its approximate position relative to the transmitters. Indoor position accuracy is 5-8 meters at best.

Heretofore, exploitation of angle of arrival of WiFi signals from a single source have not been used for room mapping, e.g., determining a space defined by walls, ceiling and floors proximate a WiFi receiver. (Times of flight of WiFi signals have also been used for this purpose.) In the current state of the art, techniques based on signal strength and time of arrival may be used to determine the location of reflective surfaces within a room.

Another solution to map surfaces within a room uses a costly LIDAR transceiver. The LIDAR transceiver scans the interior of a room from a position in the center of the room. The laser light reflected from the walls is received by the transceiver and a point cloud representation of the room dimensions is generated.

Therefore, there is a need for a method and apparatus for mapping one or more surfaces that define a portion of a room or other space using radio transmissions such as WiFi signals.

SUMMARY

Embodiments of the present disclosure generally relate to a method and apparatus that uses a transmission from a single transmitter for surface mapping as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1A:
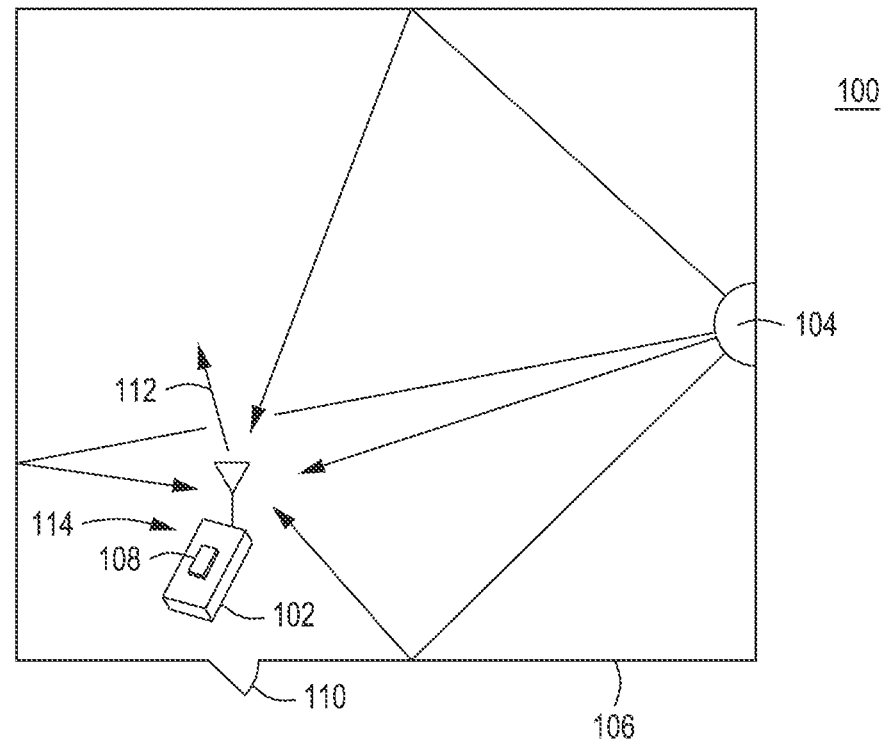
FIGS. 1A and 1B together depict a block diagram of an exemplary scenario having a receiver that uses signals transmitted by a one or more transmitters to map one or more surfaces that define a portion of a room or other space in accordance with at least one embodiment of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of the present disclosure generally relate to a method and apparatus that uses a transmission from a single transmitter for surface mapping as shown in and/or described in connection with at least one of the figures.

Embodiments of the present disclosure comprise apparatus and methods that use transmissions from a single transmitter to map one or more surfaces that define a portion of a room or other space. Digital communications systems such as cellular, Bluetooth or WiFi utilize encoded digital signals to improve communication throughput and security. These systems utilize some form of deterministic digital code to facilitate signal acquisition, e.g., acquisition codes. Such a digital code is deterministic by the receiver and repeatedly broadcast by the transmitter to enable the receivers to acquire and receive the transmitted signals. Using such deterministic codes combined with an accurate motion model of a receiver, embodiments of the present disclosure are useful for isolating signal propagation paths along specific directions of arrival (DoA). The signal may propagate directly (e.g., line-of-sight (LOS)) or via a reflection (e.g., non-line-of-sight (NLOS)). The technique for performing this DoA determination using receiver motion information is known as SUPERCORRELATION™ and is described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. In one embodiment, the receiver and the transmitter are operating within a room or other defined space (e.g., urban canyon defined by surrounding buildings). The receiver uses this DoA data regarding transmissions from the transmitter in combination with an accurate receiver position to determine the locations of surfaces that caused reflected signals. The computed locations of surfaces, such as walls, ceiling and floor, are relative to the known location of the receiver. In most situations, the receiver operates substantially in the horizontal plane. DoA data (i.e., azimuth and elevation) is not necessary if only the two dimensional locations of the walls are to be mapped, such that, angle of arrival (AoA) data (i.e., azimuth only) will suffice for deriving a location of surrounding walls. In the following description, the more general DoA data are used, but it should be understood that AoA data may be substituted for DoA data in situations where elevation is not necessary.

In one exemplary embodiment, a receiver may be transported through a space containing a transmitter (e.g., but not limited to, WiFi, Bluetooth, cellular, etc.) and be able to identify signal propagation paths (LOS and NLOS). With knowledge of the location of the transmitter (e.g., a WiFi access point or hotspot, cellular tower, etc.) and knowledge of the receiver position, embodiments of the present disclosure determine the propagation paths for LOS and NLOS signals. Receiver and transmitter positions may be apriori provided or may be determined by the receiver. These positions may be absolute (world geographic coordinates) or may be relative (arbitrary coordinate system). The receiver isolates the LOS and NLOS signals to use all the signals as if they were transmitted by different transmitters from different directions having different transmission path lengths (i.e., a virtual transmitter is defined at each image point of the NLOS signals). Processing of these isolated signals with the knowledge of the receiver's position results in a location of the reflective surfaces (i.e., walls, ceilings, floor, etc.). The functions of embodiments of the present disclosure may be embedded into cellular telephones, Internet of Things (IoT) devices, mobile computers, tablets, room mapping devices and the like. Embodiments find use on any moving receiver that receives signals having a code that can be correlated with a locally generated code. The receiver need only be able to utilize a deterministic acquisition code contained in the received signal. Although the receiver may receive the signal and utilize a full data message of the signal (i.e., WiFi, Bluetooth or cellular enabled), the receiver does not have to be fully enabled to be used in an embodiment of the present disclosure.

As the receiver traverses an area, it collects DoA data for the transmitter and the virtual transmitters formed by signal reflections. The receiver may know its position through the use of a global navigation satellite system (GNSS) receiver and/or an inertial guidance system. The receiver may know or infer its position via visual odometry or visual positioning of known objects and their positions, e.g., doors or other landmark locations and use the door/landmark position to determine the position of the receiver. Alternatively, if the initial position of the receiver relative to some absolute world coordinate system (e.g., latitude, longitude, altitude) is unknown, the receiver may adopt an initial position and orientation in an arbitrary coordinate frame in which its trajectory is subsequently tracked. From the known receiver position and a plurality of DoA vectors, embodiments of the present disclosure accurately compute the location of one or more reflective surfaces relative to the receiver position in the adopted coordinate frame. The signal reflection points representing the reflective surfaces may be interpolated into planar surfaces. As such, embodiments of the present disclosure provide a method and apparatus for generating a map of one or more surfaces that are proximate a single transmitter. When the surfaces define a room, embodiments of the present disclosure may produce a map of the room.

In what follows it is assumed that the reflection surfaces are planar. It will be apparent to one skilled in the art that further embodiments of the present disclosure can accommodate reflections from curved surfaces.

In other embodiments, the determined surface locations may be used to confirm the accuracy of three-dimensional maps of spaces or rooms. For example, a three-dimensional city map may be used by a cellular telephone handset to determine which GNSS satellites have a direct signal path to the handset. An embodiment of the present disclosure operating in the handset, may use cellular signals to determine surfaces proximate the handset. The determined surfaces may be compared to the three-dimensional city map surfaces to confirm accuracy of the map. Map errors may be reported to the map provider for correction. In other embodiments, discovering an error may cause the handset to not use the map at this particular location. Such an error may be caused by a large bus (i.e., a transient surface) being parked proximate the handset.

Some embodiments may perform the signal processing locally on the moving platform. In other embodiments, the receiver motion information and receiver position information may be gathered at the moving platform and communicated (wired or wirelessly) to a server for remote processing in real-time or at a later time.

Figure 1B:
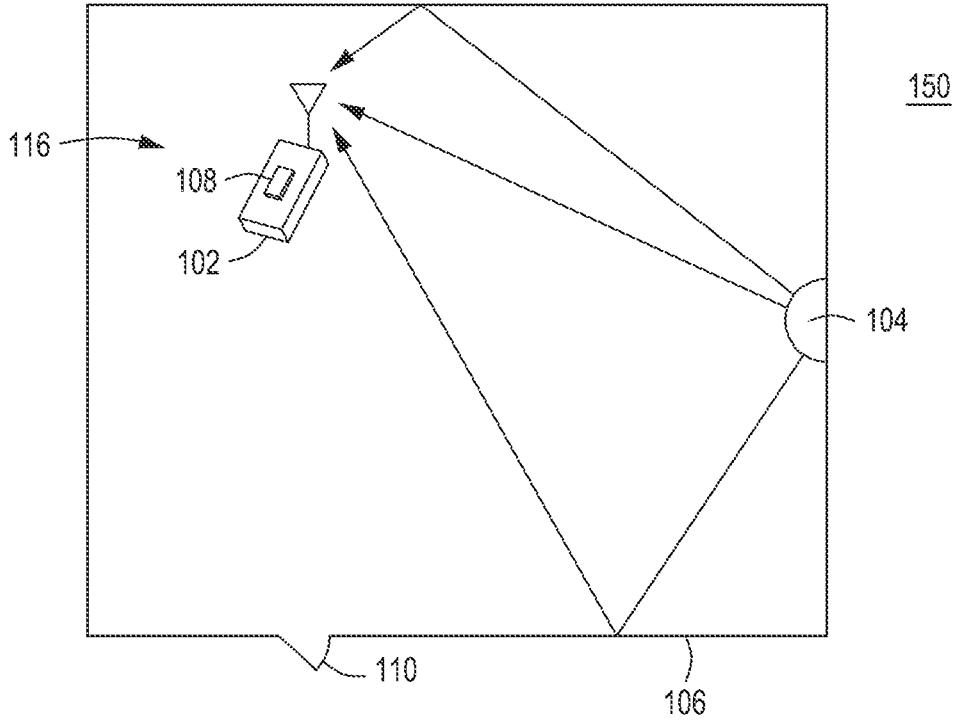

FIGS. 1A and 1B depict a block diagram of an exemplary scenario 100/150 having at least one receiver 102 for receiving signals broadcast from a single transmitter 104 in accordance with at least one embodiment of the present disclosure. FIG. 1A depicts the scenario 100 where at least one receiver 102 has entered a defined space (e.g., room, urban canyon, etc.) 106 at position 114. FIG. 1B depicts the scenario 150 where the at least one receiver 102 has moved through the space 106 to position 116. As the at least one receiver 102 moves through the space 106, the receiver 102 receives signals from the signal transmitter 104 and determines the locations of one or more reflective surfaces relative to the receiver. In the depicted scenario 100/150, the at least one receiver 102 is operating in a high multipath environment such as indoors within a space 106. In other embodiments, the receiver 102 may be operating in an urban canyon having buildings or other reflective structures proximate the receiver 102. Each of the at least one receivers 102 comprises a mapping module 108 configured to receive and process signals transmitted by the transmitter 104.

In the embodiment shown in FIG. 1A, the receiver 102 enters the room 106 knowing its position either from: (1) a global navigation satellite (GNSS) receiver and/or an inertial navigation system (INS) or (2) position knowledge from a map or visual odometry/positioning (e.g., enter through a door 110 or other landmark with a known location within the space 106). The mapping module 108 uses a known or determined location of the transmitter 104 within the space 106, the known receiver position, and receiver motion information (a motion model) in combination with the received signals that arrive directly from the transmitter (LOS signals) and reflected signals (NLOS signals) to determine an accurate surface map as the receiver traverses the space to position 116 of FIG. 1B.

In one embodiment, the transmitter location may be determined using the DoA of signals transmitted directly (i.e., LOS path) from the transmitter 104. As the receiver 102 moves, a plurality of DoA vectors may be used to determine the location of the transmitter, as will be described in detail below.

In some embodiments, the receiver 102 location and/or trajectory may not be known and the receiver 102 collects a sufficient amount of signal DoA information that the receiver 102 may determine the emitter image locations to facilitate determining the reflective surface locations. As additional DoA information is collected as the receiver 102 moves in the space, the surface locations converge to points on a planar surface that defines the surface.

As described in detail below, the at least one receiver 102 uses a SUPERCORRELATION™ technique as described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. The technique determines a direction of arrival (DoA) of signals received at a receiver (i.e., received signals) from the transmitter—both LOS and NLOS signals. As the receiver 102 moves (represented by arrow 112), the mapping module 108 computes motion information representing motion of the receiver 102. The motion information is used to perform motion compensated correlation of the received signals. From the motion compensated correlation process, the mapping module 108 estimates the DoA of the received signals. The mapping module 108 uses the receiver position and the transmitter location along with the DoA data to determine a location of reflective surfaces of the space 106. The intersection of a plurality of DoA vectors generated as the receiver moves along path 112 can be used to identify the location of reflective surfaces as described in detail below. In other embodiments, the DOA vectors are used to isolate received signals and time of arrival (TOA) or time difference of arrival (TDOA) techniques can be used to process correlation results associated with the isolated signals to determine the wall locations. Note that, because the mapping module 108 can discern the DoA of the narrowband signals which overlap in a multipath environment, the positioning module can isolate reflected signals and use those signals as if they were transmitted by transmitters located at the image points (i.e., the image points form virtual transmitter locations).

In one embodiment, the single transmitter is a WiFi transmitter having transmissions at about 2.4 GHz or 5 GHz with a signal bandwidth of 22 MHz (i.e., a narrowband signal). Other embodiments may operate using other narrowband signals such as from Bluetooth (i.e., a 1 MHz channel width) or cellular (i.e., ranging from 1 to 20 MHz depending on the standard) transmitters (e.g., 3G, 4G, 5G, etc.) having known locations, which may be fixed locations (e.g., a WiFi transmitter) or moving locations (e.g., a positioning or communications satellite).

Figure 2:
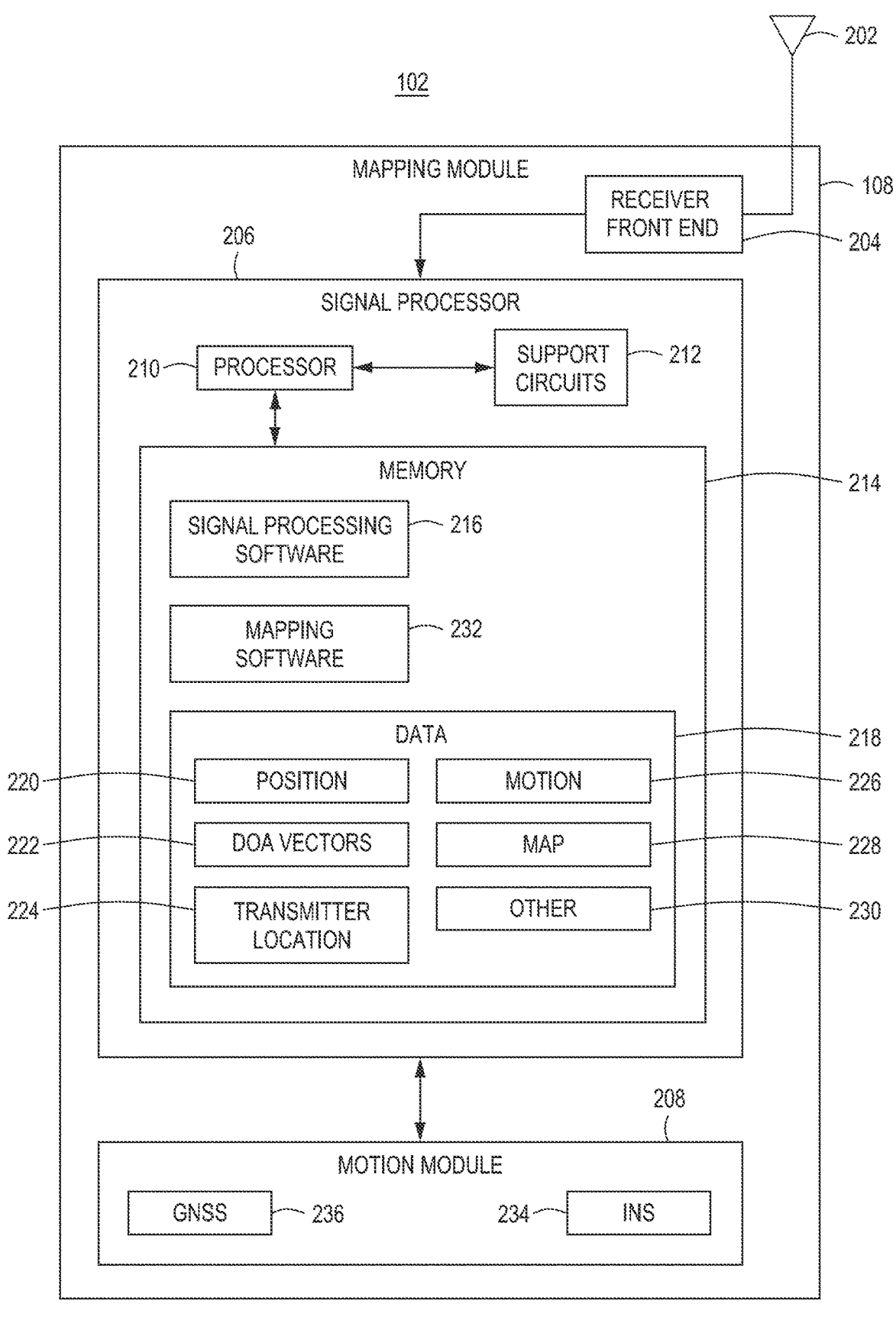
FIG. 2 is a block diagram of the receiver of FIGS. 1A and 1B in accordance with at least one embodiment of the present disclosure.

FIG. 2 is a block diagram of the receiver 102 in accordance with at least one embodiment of the present disclosure. The receiver 102 comprises a mobile platform 200, an antenna 202, receiver front end 204, signal processor 206, and motion module 208. The receiver 102 may form a portion of a laptop computer, mobile phone, tablet computer, Internet of Things (IoT) device, purpose built positioning device, etc.

In the receiver 102, the mapping module 108 and the antenna 202 are an indivisible unit where the antenna 202 moves with the positioning module 108. The operation of the SUPERCORRELATION™ technique operates based upon determining the motion of the signal receiving antenna. Any mention of motion herein refers to the motion of the antenna 202. In some embodiments, the antenna 202 may be separate from the mapping module 108. In such a situation, the motion estimate used in the motion compensated correlation process is the motion of the antenna 202. In most scenarios, the motion of the mapping module 108 is the same as the motion of the antenna 202 and, as such, the following description will assume that the motion of the mapping module 108 and antenna 202 are the same.

The mapping module 108 comprises a receiver front end 204, a signal processor 206 and a motion module 208. The receiver front end 204 downconverts, filters, and samples (digitizes) the received signals in a manner that is well-known to those skilled in the art. The output of the receiver front end 204 is a digital signal containing data. The data of interest is a deterministic training or acquisition code used by the transmitter to synchronize the transmission to a receiver, e.g., a WiFi transceiver.

The signal processor 206 comprises at least one processor 210, support circuits 212 and memory 214. The at least one processor 210 may be any form of processor or combination of processors including, but not limited to, central processing units, microprocessors, microcontrollers, field programmable gate arrays, graphics processing units, digital signal processors, and the like. The support circuits 212 may comprise well-known circuits and devices facilitating functionality of the processor(s). The support circuits 212 may comprise one or more of, or a combination of, power supplies, clock circuits, analog to digital converters, communications circuits, cache, displays, and/or the like.

The memory 214 comprises one or more forms of non-transitory computer readable media including one or more of, or any combination of, read-only memory or random-access memory. The memory 214 stores software and data including, for example, signal processing software 216, mapping software 232 and data 218. The data 218 comprises the receiver location 220, direction of arrival (DoA) vectors 222 (collectively, DoA data), transmitter location 224, motion information 226, a surface map 228, and various other data used to perform the SUPERCORRELATION™ processing. The signal processing software 216, when executed by the one or more processors 210, performs motion compensated correlation upon the received signals to estimate the DoA vectors for the received signals. The motion compensated correlation process is described in detail below.

As described below in detail, the DoA vectors 222 and transmitter location 224 are used by the mapping software 208 to determine locations of reflective surfaces and thus determine a surface map 228. In some embodiments, the receiver location may be known and, in other embodiments, the receiver location may be unknown. When the receiver location is unknown, techniques known to those skilled in the art such as Simultaneous Localisation and Mapping can be used to estimate the surface map and the receiver trajectory from the data. The data 218 stored in memory 214 may also include signal estimates, correlation results, motion compensation information, motion information, motion and/or other receiver parameter hypotheses, position information and the like (e.g., other data 230).

The motion module 208 generates a motion estimate for the antenna 202. The motion module 208 may comprise an inertial navigation system (INS) 234 as well as a global navigation satellite system (GNSS) receiver 236 such as GPS, GLONASS, GALILEO, DEIBOU, etc. The INS 234 may comprise one or more of, but not limited to, a gyroscope, a magnetometer, an accelerometer, and the like. To facilitate motion compensated correlation, the motion module 208 produces motion information (sometimes referred to as a motion model) comprising at least a velocity of the antenna 202 in the direction of interest, i.e., an estimated direction of a source of a received signal or a reflection point of a received reflected signal. In some embodiments, the motion information may also comprise estimates of platform orientation or heading including, but not limited to, pitch, roll and yaw of the module 200/antenna 202. Generally, as described in more detail below, the receiver 102 may test every direction and iteratively narrow the search to one or more directions of interest. In some embodiments, the receiver 102 uses a priori knowledge of the receiver position, room dimensions, transmitter location, and the like to narrow the range of parameters to be searched.

Figure 3:
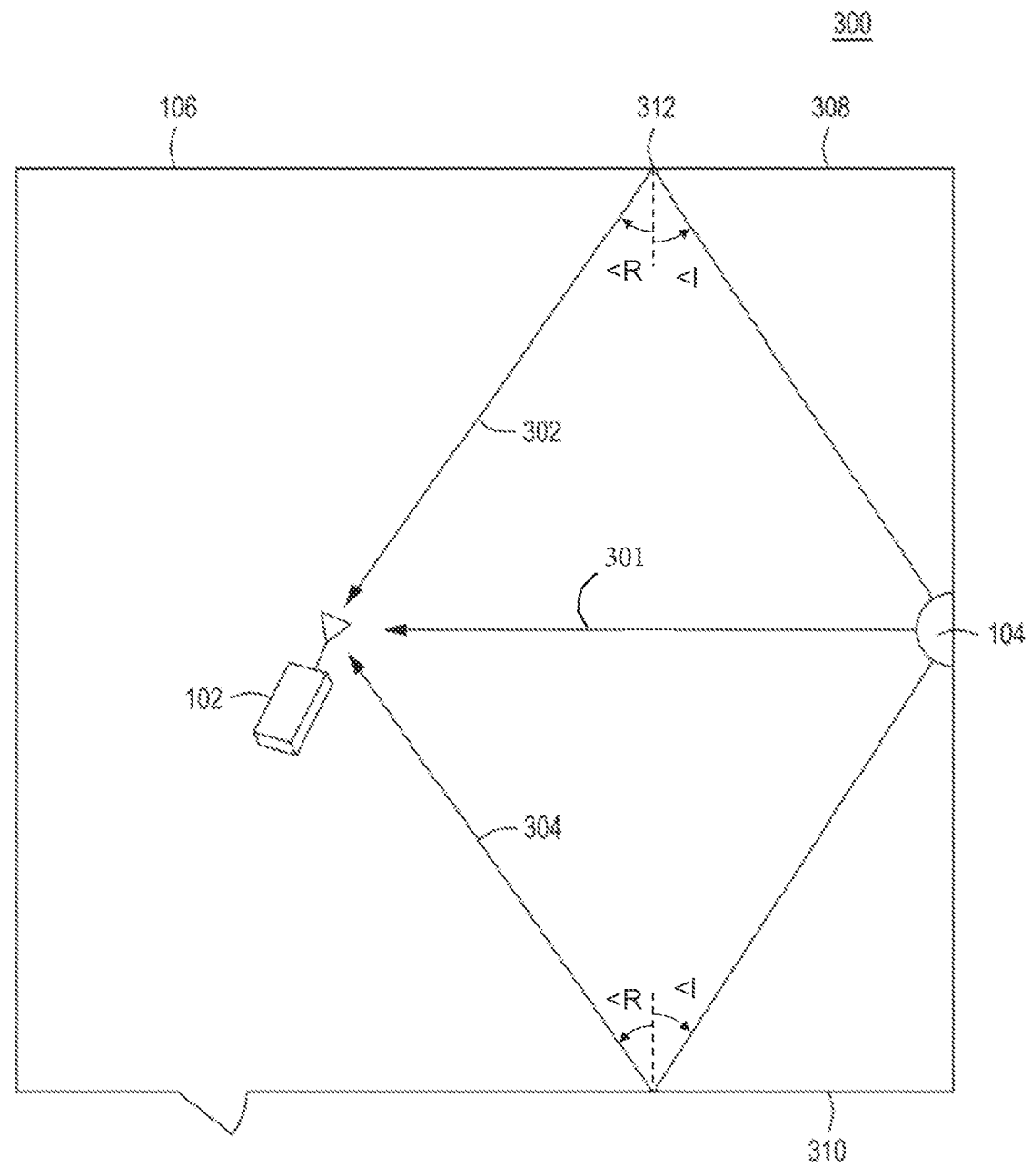
FIG. 3 depicts an exemplary scenario of operation of the receiver of FIGS. 1A, 1B and 2 in accordance with at least one embodiment of the present disclosure.

FIG. 3 depicts a scenario 300 of operation of the receiver 102 of FIGS. 1 and 2 in accordance with at least one embodiment of the present disclosure. The scenario 300 comprises the receiver 102 moving through a room 106. As the receiver 102 traverses the area, the receiver 102 computes a DoA vectors 301, 302 and 304 (for clarity only three vectors are depicted). The three DoA vectors 301, 302, 304 intersect at the location of the receiver 102. In various embodiments, the DoA vectors may be computed periodically, intermittently, or continuously as the receiver moves. Additional vectors may be used to converge the solution onto an accurate reflective surface location. The DoA vectors may be processed at a remotely located server to improve the accuracy of the surface determination.

In an urban environment, some DoA vectors 301 are derived from line-of-sight (LOS) signals and some DoA vectors 302 and 304 are derived from non-line-of-sight (NLOS) signals, i.e., LOS vectors represent signals that are transmitted directly from the transmitter 104 to the receiver 102, while NLOS vectors may be reflected from structures (e.g., walls of a room 106 or nearby buildings) in the vicinity of the receiver 102.

The structures causing reflections are modeled from the DoA of the NLOS signal. Consequently, the path of the reflected transmitter signal is estimated, and the reflected signals may be used in the mapping calculation.

In other embodiments, one or more receivers 102 may collect all transmitter signals, LOS and NLOS, over a period of time while the receiver(s) are traversing an area. These collected signals may be processed using the receiver mapping techniques described herein to create a signal profile for a region. The signal formula will contain DoA vector information that is used to produce a reflective surface map.

The forgoing embodiment performs the receiver vector and mapping functions within the receiver 102. In other embodiments, the data (i.e., emitter data) for producing DoA vectors, DoA vectors themselves, position information, etc. may be transmitted from the receiver to a server for processing to produce the receiver positions.

In operation, the receiver 102 performs the SUPERCORRELATION™ technique to motion compensate the received signals arriving from the transmitter 104. These signals may arrive unimpeded as a direct LOS signal 301. Other signals along paths 302 and 304 reflect from the surfaces (e.g., walls 308 and 310) and arrive at the receiver 102. For example, the transmitted radio signal leaves the transmitter 104 and propagates to the wall 308 where the signal contacts the wall 308 and an angle of incidence (<I). The reflected signal leaves the wall 308 and an angle of reflection (<R) that is equal to <I. At a point 312 along the wall, the transmitted signal reflects from the wall and the signal on path 302 impinges upon the receiver antenna. The same reflective process occurs for wall 310 and signal path 304. The DoA of these signals forms the DoA vectors computed by the receiver.

To determine an accurate reflector location, the receiver 102 has an accurate understanding of its position relative to the transmitter 104 and has an accurate understanding of the motion of the receiver. The receiver 102 receives the signals from the transmitter 104 and correlates those signals with locally generated signals to determine correlation results. In some embodiments, the correlation result of each received signal may be used to produce a time of arrival for each signal. These correlation results are motion compensated using the receiver motion to correct for doppler and doppler rate changes due to the receiver motion and extend the coherent integration period of the receiver such that accurate correlation results are used in determining time of arrival to a sub-wavelength level.

The DoA vectors require processing to enable accurate reflector positioning. The DoA vector estimates are used to define a search space of directions from which signals may arrive. The system maintains a set of hypotheses for the number and layout of walls, or the number and layout of virtual transmitter images, in the environment. By testing each hypothesis against the ToA and DoA measurements over time, the receiver converges upon an accurate floorplan. Techniques such as Simultaneous Localisation and Mapping are known methods to those skilled in the art for solving such problems. As such, a signal arriving from a particular direction can be isolated from other reflected signals and the isolated signal processed with other isolated signals to generate accurate reflector position information that can be used to produce a room map. Without the use of a motion compensated correlation technique (e.g., SUPERCORRELATION™), the signals, especially narrowband signals, could not be isolated according to angle of arrival and time of arrival to enable a single transmitter to be used for room mapping.

In one embodiment, the surface locations are determined relative to the receiver position. The coordinate system may be arbitrary or based upon world geo-coordinates (e.g., GNSS coordinates). In some embodiments, the surface position is mapped in an arbitrary coordinate system and subsequently aligned to a world coordinate system when a world coordinate reference becomes known.

Figure 4:
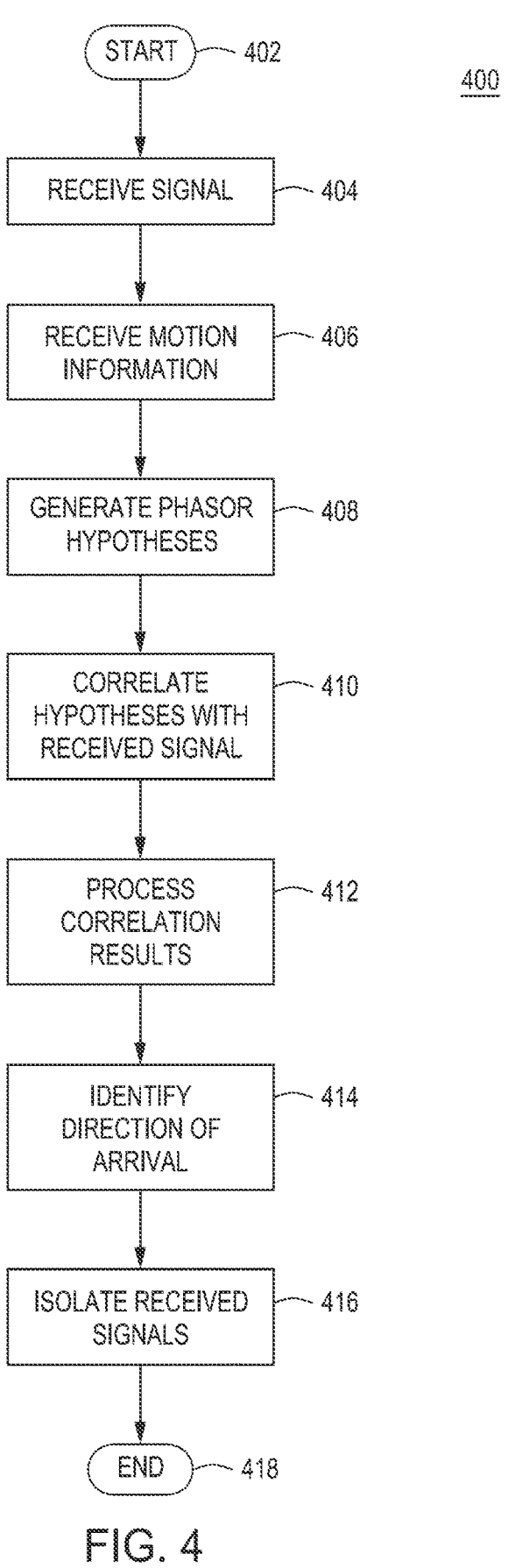
FIG. 4 is a flow diagram of a method of operation for the signal processing software in accordance with at least one embodiment of the present disclosure.

FIG. 4 is a flow diagram of a method 400 of operation for the signal processing software 216 in accordance with at least one embodiment of the present disclosure. The method 400 may be implemented in software, hardware or a combination of both (e.g., using the signal processor 206 of FIG. 2).

The method 400 begins at 402 and proceeds to 404 where signals are received at a receiver from a remote source (e.g., transmitter 104) in a manner as described with respect to FIGS. 1A, 1B, 2 and 3. Each received signal comprises a synchronization or acquisition code, i.e., a deterministic code, extracted from the radio frequency (RF) signal received at the antenna. The process of downconverting the RF signal and extracting the digital code is well known in the art. At 406, the method 400 receives motion information from the motion module 208 of FIG. 2. The motion information comprises an estimate of the motion of the receiver 102 of FIG. 1, e.g., one or more of velocity, heading, orientation, etc.

At 408, the method 400 generates a plurality of phasor sequence hypotheses related to a direction of interest of the received signal, e.g., direction of the transmitter or direction of one or more reflections. These hypotheses comprise a plurality of local signals representing code phase estimates. Each phasor sequence hypothesis comprises a series of phase offsets that vary with parameters of the receiver such as motion, frequency, DoA of the received signals, and the like. The signal processing software correlates a local code encoded in a local signal with a code encoded in the received RF signal. In one embodiment, the phasor sequence hypotheses are used to adjust, at a sub-wavelength accuracy, the carrier phase of the local code over one or more periods (lengths) of the received code. Such adjustment or compensation may be performed by adjusting a local oscillator signal (e.g., generated by a local oscillator of the receiver), the received signal(s), or the correlation result to produce a phase compensated correlation result. The signals and/or correlation results are complex signals comprising in-phase (I) and quadrature phase (Q) components. The method applies each phase offset in the phasor sequence to a corresponding complex sample in the signals or correlation results. If the phase adjustment is or includes an adjustment for receiver motion, then the result is a motion compensated correlation result. For each received signal, at 410, the method 400 correlates the received signals with a set (plurality) of direction hypotheses containing estimates of a phase offset necessary to accurately correlate the received signals arriving from particular directions. There is a set of hypotheses representing a search space for each received signal and each parameter of interest, e.g., motion, frequency, frequency rate, DoA, etc.

In one embodiment, since the signal is received from a single transmitter, the set of hypotheses for newly received signals from the transmitter include a group of phasor sequence hypotheses using the expected Doppler and Doppler rate and/or last Doppler and last Doppler rate used in receiving the prior signal from that transmitter. The values may be centered around the last values used or the last values used additionally offset by a prediction of further offset based on the expected receiver motion. At 410, the method 400 correlates each received signal with that signal's set of hypotheses. The hypotheses are used as parameters to form the phase-compensated phasors to phase compensate the correlation process. As such, the phase compensation may be applied to the received signals, the local frequency source (e.g., an oscillator), or the correlation result values. The hypotheses collectively form a search space within which the method 400 tests each of the hypotheses to determine a preferred hypothesis. In addition to searching over the DoA space, the method 400 may also apply hypotheses related to other parameters such as oscillator frequency to correct frequency and/or phase drift, or heading to ensure the correct motion compensation is being applied. The result of the correlation process is a plurality of phase-compensated correlation results—one phase-compensated correlation result value for each hypothesis for each received signal. The reflected signals from the single transmitter are naturally synchronized to it. Any drift and perturbations in the transmitter oscillator are contained in all the reflected signals. The receiver oscillator can therefore easily be referenced against the transmitter oscillator using the line of sight signal or any of the reflected signals once the Doppler effect from the receiver motion has been accounted for.

At 412, the method 400 processes the correlation results to find the "best" or optimal result for each received signal, i.e., isolate each signal using an optimal DoA hypothesis. In one embodiment, the method 400 produces a joint correlation output as a function (e.g., summation) of the plurality of correlation results resulting from all the hypotheses and all received signals. The joint correlation output may be a single value or a plurality of values that represent the parameter hypotheses (preferred hypotheses) that provide an optimal or best correlation output. In general, a cost function is applied to each set of correlation values for each received signal to find the optimal correlation output corresponding to a preferred hypothesis or hypotheses. The joint correlation output reveals the frequency and frequency rate offset between the receiver oscillator and the transmitter oscillator, allowing the receiver to be synchronized to the transmitter accordingly.

At 414, the method 400 identifies the DoA vector of each received signal from the optimal correlation result for the signal. The received signals along the DoA vector typically have the strongest signal to noise ratio and represent line of sight (LOS) propagation or NLOS propagation having a single reflection point. As such, using motion compensated correlation enables the receiver 102 to identify the DoA vector of the received signal(s).

In other embodiments, rather than using the largest magnitude correlation value, other test criteria may be used. For example, the method 400 may monitor the progression of correlations as hypotheses are tested and apply a cost function that indicates the best hypotheses when the cost function reaches a minimum (e.g., a small hamming distance amongst peaks in the correlation plots). As such, the joint correlation output may be a joint correlation value or a group of values. In other embodiments, additional hypotheses may be tested in addition to the DoA hypotheses to, for example, ensure the motion compensation (i.e., speed and heading) is correct.

At 416, the method 400 uses the DoA associated with the preferred hypotheses to isolate the received signals and their associated motion compensated correlation results. These correlation results may be used by the positioning software to improve the current receiver position estimate as described with respect to FIG. 5. The method 400 ends at 416.

Figure 5:
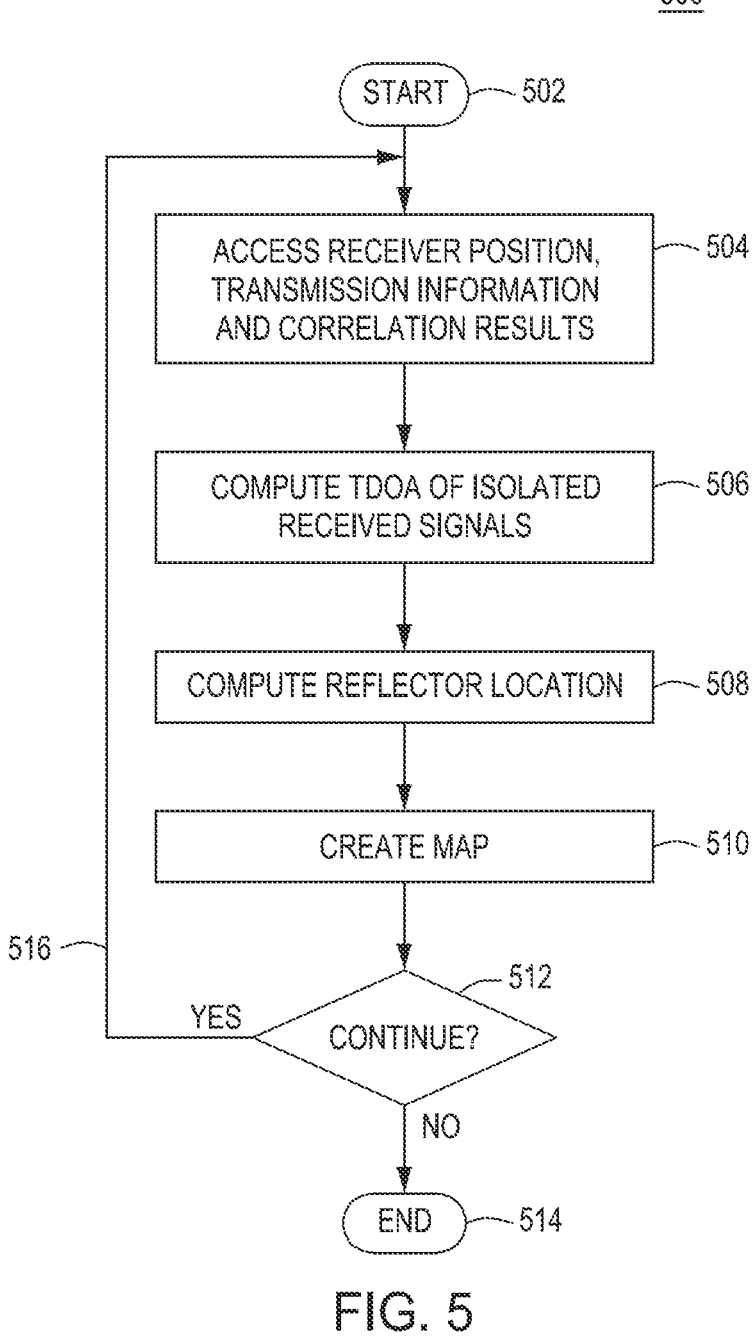
FIG. 5 is a flow diagram of a method of operation of the surface mapping software in accordance with at least one embodiment of the present disclosure.

FIG. 5 is a flow diagram of a method 500 of operation of the mapping software 232 in accordance with at least one embodiment of the present disclosure. The method 500 may be performed locally within the receiver or may be performed remotely on a server. If performed remotely, the estimated receiver position, correlation results for the isolated received signals, and other information are transmitted from the receiver to the remote server for processing in accordance with method 500.

The method 500 begins at 502 and proceeds to 504 where the method 500 accesses a receiver position, transmission information and the correlation results for the isolated received signals. The position is the current position of the receiver (i.e., the GNSS/INS position). The transmission information comprises any information regarding the transmitter and the transmission paths of the isolated signals that is required to compute reflector location from the received signals. For example, depending on the method used to compute the transmission path, the transmission information may comprise, but is not limited to, one or more of the following: a transmission time stamp, a received signal time stamp, an estimated transmission path length, a transmitter position, a reflection position, etc.

At 506, in one embodiment, the method 500 determines a time difference of arrival (TDOA) for the isolated received signals based on the motion compensated correlation results and the transmission information. In lieu of the TDOA information, the method may produce direction or angle of arrival information or time of arrival information. In general, this step produces whatever information is required to compute the reflector position.

At 508, using the time difference of arrival information for each received signal, the method 500 computes a reflector position (e.g., a point of reflection that results in the time difference of arrival between the LOS signal and a NLOS signal). In other embodiments, time of arrival or direction/angle of arrival techniques may be used to compute the reflector position. All of these positioning techniques (also known as localization techniques) are well known to those skilled in the art.

At 510, the method 500 combines all the reflection points determined as the receiver moved into planar surfaces. The method 500 may apply smoothing to merge the reflection points into smooth, planar surfaces. The collection of surfaces forms a room or space map. At 512, the method queries whether the method 500 should continue to determine reflector positions. If the query is affirmatively answered, the method 500 returns to 504 along path 516. If the query is negatively answered, the method 500 ends at 514.

Various embodiments of the present disclosure may be used to generate maps describing radio signal reflective surface (e.g., room maps, urban canyon city maps, etc.). In other embodiments, the techniques described herein may be used to confirm the accuracy of apriori provided surface maps. Consequently, inaccurate provided maps may be identified for correction or may not be used in current position location calculations.

Figure 6:
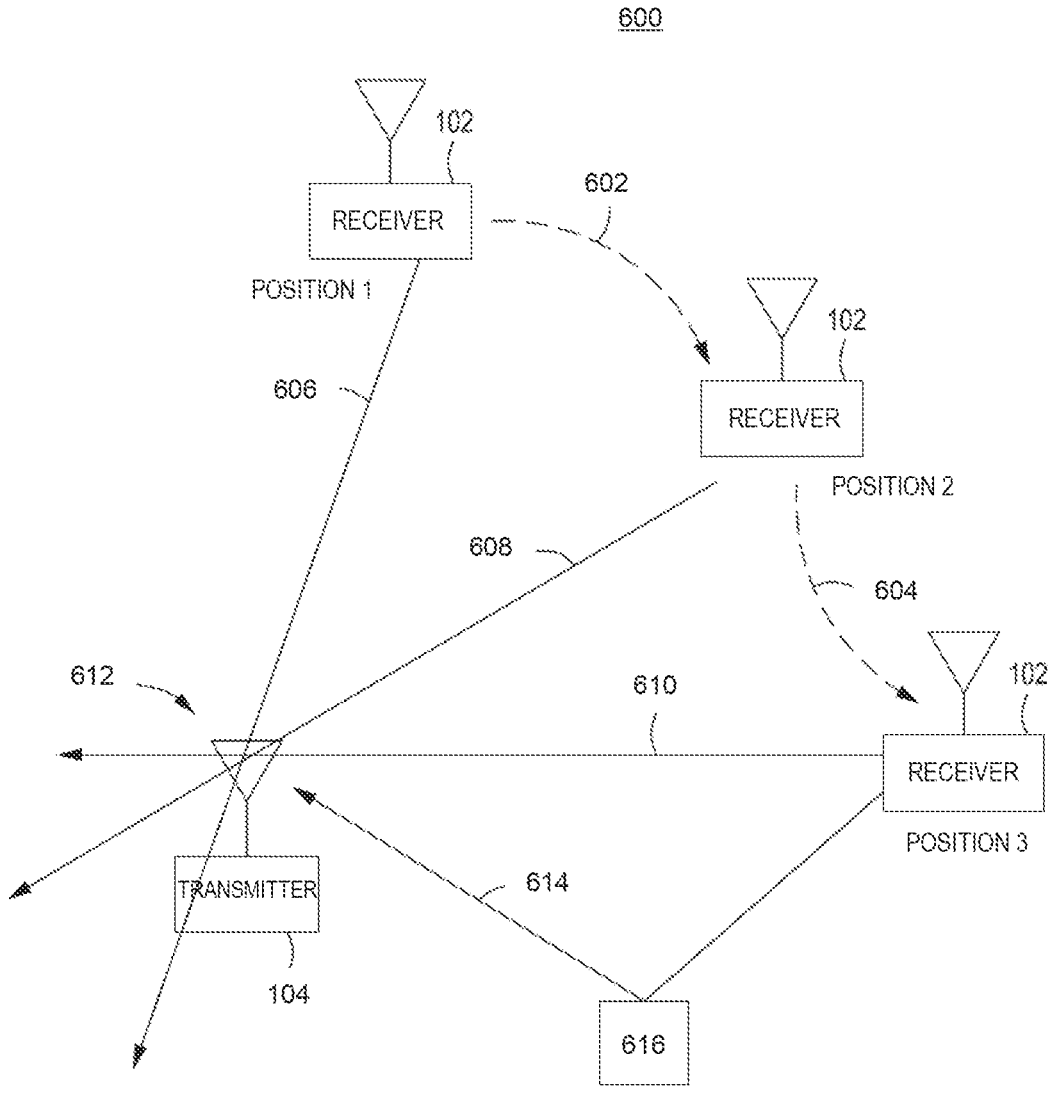
FIG. 6 depicts an exemplary scenario of operation of the receiver of FIGS. 1A, 1B and 2 in accordance with at least one embodiment of the present disclosure.

As discussed above, the location of the transmitter may be known, or a plurality of DoA vectors may be used to determine the location of the transmitter as the receiver 102 moves. An example of using the DoA vectors to determine the location of the transmitter is now described with reference to FIG. 6. As shown in FIG. 6, a scenario 600 comprises the receiver 102 moving from position 1 along path 602 to position 2, and then moving along path 604 to position 3. As the receiver 102 traverses the area, the receiver 102 computes a DoA vector 606 at position 1, 608 at position 2 and 610 at position 3. The three DoA vectors 606, 608 and 610 intersect at the location 612 of the transmitter 104. Although three discrete positions are described as where the DoA vectors are computed, in other embodiments, the DoA vectors may be computed periodically, intermittently or continuously as the receiver moves. Additional vectors may be used to converge the solution onto an accurate transmitter location.

Where there are structures 616 around the receiver 102 and transmitter 104 (e.g., reflective surfaces such as walls or buildings), some DoA vectors 602, 604, 606 may be line-of-sight (LOS) and some DoA vectors 614 may be non-line-of-sight (NLOS), i.e., LOS vectors represent signals that are transmitted directly from the transmitter 104 to the receiver 102, while NLOS vectors may be reflected from structures 616 in the vicinity of the receiver 102. As more and more DoA vectors are collected and processed, the LOS vectors converge on a particular location, e.g., location 612. In addition, if TOA or TDOA information is available, the information may be used to remove DoA vectors of NLOS paths because the arrival times will be anomalous (delayed) for the NLOS signals versus the LOS signals, i.e., the time information of NLOS signals will contain a delay compared to the LOS signals.

In other embodiments, the structures 616 may be modeled in a building model. The building model in conjunction with ray tracing techniques can be used to determine the DoA of reflected signals. Consequently, the path of the reflected transmitter signal is estimated and the reflected signals may be used in the transmitter localization calculation.

In other embodiments, one or more receivers 102 may collect all transmitter signals, LOS and NLOS, over a period of time while the receivers are traversing an area. These collected signals may be processed using the transmitter localization technique described above to create a signal profile for a region. The signal formula will contain DoA vector intersection regions that identify transmitter locations. In some embodiments, a Bayesian estimator may be used to compare various hypotheses as to transmitter location using information provided by available measurements.

Typically, vector intersection location 612 is not a point, but rather it is a region or area due to the probabilistic nature of the DoA vectors, i.e., the determined direction of each vector has an uncertainty caused by measurement error and the intersection forms a region rather than a point. The region will have a maximum that defines the location of the transmitter 104.

Since the receiver 102 knows its position through GNSS and/or INS calculations, the geolocation coordinates of the receiver 102 may be translated into a geolocation coordinate for transmitter location 612. As such, a geolocation map of transmitter locations may be generated. Although the scenario depicts a receiver 102 computing a location 612 of a single transmitter 104, in various other embodiments, the receiver 102 may produce locations for many nearby transmitters sequentially and/or simultaneously.

The foregoing scenario 600 performs the transmitter vector and location determination within the receiver 102. In other embodiments, the data for producing DoA vectors, DoA vectors themselves, position information, etc. may be transmitted from the receiver to a server (not shown) for processing to produce the transmitter locations.

Further details related to this technique for determining the location of the transmitter are described in U.S. patent application Ser. No. 63/357,270, filed 30 Jun. 2022, entitled "Method and Apparatus for Locating Emitters in a Cellular Network," which is hereby incorporated herein by reference in its entirety.

Exemplary Embodiments

According to one aspect of the present disclosure, there is provided a method for mapping a surface using signals transmitted from a single transmitter, comprising: a) receiving a plurality of signals transmitted from the single transmitter, where each of the plurality of signals has a different propagation path; b) determining a motion of an antenna of the receiver; c) generating a plurality of phasor sequences, where each phasor sequence represents a hypothesis based on antenna motion and a direction of arrival estimate for each of the plurality of the received signals; d) compensating the received signals, a plurality of local signals or correlation results from correlating the received signals with the local signals using the plurality of phasor sequences based on the plurality of hypotheses regarding the receiver motion (e.g., the motion of the antenna of the receiver) and the direction of arrival to generate a plurality of compensated correlation results; e) determining a preferred hypothesis in the plurality of hypotheses for each received signal that optimizes each correlation result in the plurality of compensated correlation results; f) identifying a direction of arrival for each of the plurality of received signals using the determined hypothesis; g) determining a point of reflection from the direction of arrival of each received signal in the plurality of received signals; and h) combining the points of reflection into one or more reflective surfaces.

In this way, by identifying a direction of arrival for (each of) the plurality of received signals, the reflective surface(s) in the vicinity of the receiver may advantageously be determined (e.g., mapped) using signals received from a single (e.g., WiFi) transmitter that have travelled along different propagation paths between the transmitter and the receiver, and therefore have different directions of arrival at the receiver.

Typically, the signals received at the receiver include signals that have propagated directly between the transmitter and receiver (e.g., line-of-sight (LOS) signals) and via a reflection (e.g., non-line-of-sight (NLOS) signals).

The one or more reflective surfaces may be used to generate a map. In some embodiments the map may be a map of the reflective surface(s) proximate the single transmitter. The map may be a map of a room (for example where the reflective surfaces define a room (e.g., correspond to the walls, floor and/or ceiling of a room)) or may be a city map (for example where the reflective surfaces define buildings). The map may be a three-dimensional map. The one or more reflective surfaces may be used to confirm the accuracy of an existing map. Advantageously, some embodiments of the present disclosure enable a map to be created (or an existing map confirmed) using only signals received from a single transmitter.

A phasor sequence comprises a sequence of phasors that each comprise a phase angle and an amplitude based upon the (determined) motion of the antenna at a particular time t. Each phasor sequence is indicative of the phase and/or amplitude changes introduced into the received signal as a result of the component of the antenna motion along a particular direction as a function of time. The phasor sequence may also be indicative of other system parameters such as clock error. A compensated correlation result based on a phasor sequence indicative of the antenna motion along a particular direction (e.g., the component of the antenna motion along a particular direction) will exhibit preferential gain for a signal received along that direction in comparison with a signal that is not received along that direction. Therefore, a phasor sequence that represents the component of the antenna motion along a particular direction is indicative of a direction of arrival hypothesis for that direction. For a particular correlation of a local signal with a received signal to produce a correlation result, a phasor sequence may be used to compensate at least one of the local signal, the received signal, and the correlation result, in order to generate a compensated correlation result.

Compensation based on the receiver motion may be referred to herein as "motion compensation".

The local signals may typically be generated using a frequency reference provided by a local oscillator (e.g., a quartz crystal) that may be a constituent component of the receiver.

The point of reflection (e.g., determined for a particular received signal) may be determined based on a known receiver position. The receiver position may be determined based on one or more of: a global navigation satellite system, an inertial guidance system, visual odometry, and/or a comparison with a landmark location with a known position.

The point of reflection and a position of the receiver may be determined using simultaneous localization and mapping. In this way, it is possible to generate a surface map and estimate the receiver trajectory.

Typically, the point of reflection may be determined based on information indicative of the location of the single transmitter.

The point of reflection may be determined using one or more of: a transmission time stamp, a received signal time stamp, an estimated transmission path length, a time difference of arrival between received signals, a time of arrival, and/or an angle of arrival. These one or more parameters (e.g., of the received signals) for determining the point of reflection may constitute an be referred to herein as "transmission information". In general, the transmission information may comprise any information regarding the transmitter and the transmission paths of the received signals that is required to compute the reflector location from the received signals, and may comprise one or more of the above parameters. For example, based on the compensated correlation results and the transmission information, a time difference of arrival (TDOA) may be determined for (e.g., separate) isolated received signals; subsequently a point of reflection may be determined based on the TDOA, such as by determining a point of reflection that results in the required TDOA for the received signals (e.g., a line of sight and a non-line of sight signal). Alternatively, or additionally, angle of arrival or time of arrival information may be used to determine the point of reflection.

In some embodiments, combining the points of reflection may include smoothing and/or interpolation (e.g., of the points of reflection). The reflection points may be smoothed (e.g., "merged") and/or interpolated into planar and/or curved surfaces.

The hypotheses may be based on a previously determined preferred hypothesis. The previously determined preferred hypothesis may be determined from a previous repetition of the method (e.g., for a previous epoch). Since the true values of the hypotheses correlate strongly between repetitions, the search space of the hypotheses may be narrowed over time to make the search less intensive while still converging to the true value.

The hypotheses may be offset from the previously determined preferred hypothesis based on an expected receiver motion. The hypotheses may be centered around a previously determined preferred hypothesis. Since the receiver is expected to move in a manner that obeys the laws of physics, the hypotheses may be based on the expected (e.g., predicted) receiver motion. In this way, the number of hypotheses that need to be tested before determining the preferred hypothesis may be reduced.

The hypotheses may be further based on a local oscillator frequency error. The local oscillator frequency error may be referred to herein as the clock error. The local oscillator is typically used to generate the local signals, and is typically a constituent component of the receiver. The clock error is typically common to all the received signals. The hypotheses may therefore compensate or remove the clock error in order to enable calculation of a more accurate point of reflection. The clock error may be determined using techniques known in the art.

Determining the motion of the antenna may include determining one or more of velocity, heading, and/or orientation of the antenna. The motion of the antenna may be measured (e.g., using an inertial navigation system) or estimated (e.g., based on patterns of motion in previous epochs).

The preferred hypothesis for a given received signal may correspond to a hypothesis that provides a compensated correlation result with the strongest signal-to-noise ratio or highest power (e.g., the optimal, or "best", correlation result) for that signal. In this way, the direction of arrival for each received signal may be determined based on (e.g., corresponds to) the preferred hypothesis for that signal that provides the optimal correlation result amongst the plurality of correlation results corresponding to the plurality of hypotheses.

Determining a preferred hypothesis may include performing a mathematical optimization process across the plurality of compensated correlation results in order to find the optimal compensated correlation result corresponding to the preferred hypothesis. The preferred hypothesis may be determined based on a cost function. This may include producing a joint correlation output in which the cost function (e.g., a summation or weighted summation) is applied to each set of correlation values for each received signal to find the optimal (e.g., highest power) correlation output corresponding to a preferred hypothesis or hypotheses.

The (single) transmitter may have a known location. In some embodiments, the transmitter may be one of: a WiFi transmitter, a Bluetooth transmitter, a cellular transmitter, a communications satellite, or positioning satellite. The transmitter may be a fixed transmitter or may be a moving transmitter.

The method may further comprise (e.g., iteratively) repeating steps a) to h) to update the one or more reflective surfaces. Accordingly, the reflective surface(s) may be updated or refined using the results of several repetitions.

According to another aspect of the present disclosure, there is provided an apparatus for performing signal correlation within a signal processing system, comprising at least one processor and at least one non-transient computer readable medium for storing instructions that, when executed by the at least one processor, causes the apparatus to perform operations comprising: receiving a plurality of signals transmitted from a single transmitter, where each of the plurality of signals has a different propagation path; determining a motion of an antenna of the receiver; generating a plurality of phasor sequences, where each phasor sequence represents a hypothesis based on antenna motion and a direction of arrival estimate for each of the plurality of the received signals; compensating the received signals, a plurality of local signals or correlation results from correlating the received signals with the local signals using the plurality of phasor sequences based on the plurality of hypotheses regarding the receiver motion and the direction of arrival to generate a plurality of compensated correlation results; determining a preferred hypothesis in the plurality of hypotheses for each received signal that optimizes each correlation result in the plurality of compensated correlation results; identifying a direction of arrival for each of the plurality of received signals using the determined hypothesis; determining a point of reflection from the direction of arrival of each received signal in the plurality of received signals; and combine the points of reflection into one or more reflective surfaces (e.g., defining a room).

The apparatus of this aspect of the present disclosure therefore provides all of the advantages described above with reference to the previous aspect. The apparatus of this aspect of the present disclosure may be configured to perform the methods of any of the examples discussed above with reference to the first aspect of the present disclosure.

According to another aspect of the present disclosure, there is provided an apparatus for performing signal correlation within a signal processing system, comprising at least one processor and at least one non-transient computer readable medium for storing instructions that, when executed by the at least one processor, causes the apparatus to perform the method as described above and herein.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present disclosure, other and further embodiments may be devised without departing from the basic scope thereof, and the scope thereof is determined by the claims that follow.

The invention claimed is:

1. A method for mapping a surface using signals transmitted from a single transmitter, comprising:
  a) receiving by a receiver a plurality of signals transmitted from the single transmitter, where each of the plurality of signals has a different propagation path;
  b) determining a motion of an antenna of the receiver;
  c) generating a plurality of phasor sequences, where each phasor sequence represents a hypothesis based on antenna motion and a direction of arrival estimate for each of the plurality of the received signals;

d) compensating the received signals, a plurality of local signals generated by a local oscillator, or correlation results, which are obtained by correlating the received signals with the local signals using the plurality of phasor sequences, to generate a plurality of compensated correlation results;

e) determining a preferred hypothesis from among the plurality of hypotheses for each received signal that optimizes each compensated correlation result in the plurality of compensated correlation results;

f) identifying a direction of arrival for each of the plurality of received signals using the determined preferred hypothesis;

g) determining a point of reflection from the direction of arrival of each received signal in the plurality of received signals; and h) combining the points of reflection into one or more reflective surfaces, wherein combining the points of reflection includes at least one of smoothing or interpolation.

2. The method of claim 1, wherein the one or more reflective surfaces are used to generate a map.

3. The method of claim 1, wherein the one or more reflective surfaces are used to confirm the accuracy of an existing map.

4. The method of claim 1, wherein the point of reflection is determined based on a known receiver position.

5. The method of claim 4, wherein the receiver position is determined based on at least one of: a global navigation satellite system, an inertial guidance system, visual odometry, or a comparison with a landmark location with a known position.

6. The method of claim 1, wherein the point of reflection and a position of the receiver are determined using simultaneous localization and mapping.

7. The method of claim 1, wherein the point of reflection is determined using at least one of: a transmission time stamp, a received signal time stamp, an estimated transmission path length, a time difference of arrival between received signals, a time of arrival, or an angle of arrival.

8. The method of claim 1, wherein the hypotheses are based on a previously determined preferred hypothesis.

9. The method of claim 8, wherein the hypotheses are offset from the previously determined preferred hypothesis based on an expected receiver motion.

10. The method of claim 1, wherein the hypotheses are further based on a local oscillator frequency error.

11. The method of claim 1, wherein determining the motion of the antenna includes determining at least one of velocity, heading, or orientation of the antenna.

12. The method of claim 1, wherein the preferred hypothesis is determined based on a cost function.

13. The method of claim 1, wherein the transmitter has a known location.

14. The method of claim 13, wherein the transmitter is one of: a WiFi transmitter, a Bluetooth transmitter, a cellular transmitter, a communications satellite, or a positioning satellite.

15. The method of claim 1, further comprising repeating steps a) to h) to update the one or more reflective surfaces.

16. The method of claim 1, wherein the one or more reflective surfaces define a room.

17. Apparatus for performing signal correlation within a signal processing system, comprising at least one processor and at least one non-transient computer readable medium for storing instructions that, when executed by the at least one processor, causes the apparatus to perform operations comprising:

receiving by a receiver a plurality of signals transmitted from a single transmitter, where each of the plurality of signals has a different propagation path;

determining a motion of an antenna of the receiver;

generating a plurality of phasor sequences, where each phasor sequence represents a hypothesis based on antenna motion and a direction of arrival estimate for each of the plurality of the received signals;

compensating the received signals, a plurality of local signals generated by a local oscillator, or correlation results, which are obtained by correlating the received signals with the local signals using the plurality of phasor sequences to generate a plurality of compensated correlation results;

determining a preferred hypothesis from among the plurality of hypotheses for each received signal that optimizes each compensated correlation result in the plurality of compensated correlation results;

identifying a direction of arrival for each of the plurality of received signals using the determined preferred hypothesis;

determining a point of reflection from the direction of arrival of each received signal in the plurality of received signals; and combining the points of reflection into one or more reflective surfaces, wherein combining the points of reflection includes at least one of smoothing or interpolation.

18. The apparatus of claim 17, wherein the one or more reflective surfaces define a room.

19. At least one non-transient computer readable medium for storing instructions that, when executed by at least one processor, causes the processor to perform a method for mapping a surface using signals transmitted from a single transmitter, the method comprising:

a) receiving by a receiver a plurality of signals transmitted from the single transmitter, where each of the plurality of signals has a different propagation path;

b) determining a motion of an antenna of the receiver;

c) generating a plurality of phasor sequences, where each phasor sequence represents a hypothesis based on antenna motion and a direction of arrival estimate for each of the plurality of the received signals;

d) compensating the received signals, a plurality of local signals generated by a local oscillator, or correlation results, which are obtained by correlating the received signals with the local signals using the plurality of phasor sequences to generate a plurality of compensated correlation results;

e) determining a preferred hypothesis from among the plurality of hypotheses for each received signal that optimizes each compensated correlation result in the plurality of compensated correlation results;

f) identifying a direction of arrival for each of the plurality of received signals using the determined hypothesis;

g) determining a point of reflection from the direction of arrival of each received signal in the plurality of received signals; and h) combining the points of reflection into one or more reflective surfaces, wherein combining the points of reflection includes at least one of smoothing or interpolation.

20. A method for mapping a surface using signals transmitted from a single transmitter, comprising:

a) receiving by a receiver a plurality of signals transmitted from the single transmitter, where each of the plurality of signals has a different propagation path;

b) determining a motion of an antenna of the receiver;

c) generating a plurality of phasor sequences, where each phasor sequence represents a hypothesis based on antenna motion and a direction of arrival estimate for each of the plurality of the received signals;

d) compensating the received signals, a plurality of local signals generated by a local oscillator, or correlation results, which are obtained by correlating the received signals with the local signals using the plurality of phasor sequences to generate a plurality of compensated correlation results;

e) determining a preferred hypothesis from among the plurality of hypotheses for each received signal that optimizes each compensated correlation result in the plurality of compensated correlation results;

f) identifying a direction of arrival for each of the plurality of received signals using the determined hypothesis;

g) determining a point of reflection from the direction of arrival of each received signal in the plurality of received signals; and h) combining the points of reflection into one or more reflective surfaces, wherein the hypotheses are based on a previously determined preferred hypothesis, and wherein the hypotheses are offset from the previously determined preferred hypothesis based on an expected receiver motion.

21. The method of claim 20, wherein the one or more reflective surfaces are used to generate a map.

22. The method of claim 20, wherein the one or more reflective surfaces are used to confirm the accuracy of an existing map.

23. The method of claim 20, wherein the point of reflection is determined based on a known receiver position.

24. The method of claim 23, wherein the receiver position is determined based on at least one of: a global navigation satellite system, an inertial guidance system, visual odometry, or a comparison with a landmark location with a known position.

25. The method of claim 20, wherein the point of reflection and a position of the receiver are determined using simultaneous localization and mapping.

26. The method of claim 20, wherein the point of reflection is determined using at least one of: a transmission time stamp, a received signal time stamp, an estimated transmission path length, a time difference of arrival between received signals, a time of arrival, or an angle of arrival.

27. The method of claim 20, wherein the hypotheses are further based on a local oscillator frequency error.

28. The method of claim 20, wherein determining the motion of the antenna includes determining at least one of velocity, heading, or orientation of the antenna.

29. The method of claim 20, wherein the preferred hypothesis is determined based on a cost function.

30. The method of claim 20, wherein the transmitter has a known location.

31. The method of claim 30, wherein the transmitter is one of: a WiFi transmitter, a Bluetooth transmitter, a cellular transmitter, a communications satellite, or a positioning satellite.

32. The method of claim 20, further comprising repeating steps a) to h) to update the one or more reflective surfaces.

33. The method of claim 20, wherein the one or more reflective surfaces define a room.

* * * * *